United States Patent
Sen et al.

(10) Patent No.: US 11,671,419 B2
(45) Date of Patent: Jun. 6, 2023

(54) MULTI-CLOUD DATA CONNECTIONS FOR WHITE-LABELED PLATFORMS

(71) Applicant: AppDirect, Inc., San Francisco, CA (US)

(72) Inventors: Anindya Sen, Dublin, CA (US); Dominic Lee, Sunnyvale, CA (US); Jasper Crocker, San Francisco, CA (US)

(73) Assignee: AppDirect, Inc., San Francisco, CA (US)

( * ) Notice: Subject to any disclaimer, the term of this patent is extended or adjusted under 35 U.S.C. 154(b) by 0 days.

(21) Appl. No.: 17/039,800

(22) Filed: Sep. 30, 2020

(65) Prior Publication Data

US 2022/0103542 A1 Mar. 31, 2022

(51) Int. Cl.
*H04L 9/40* (2022.01)
*G06F 16/957* (2019.01)
*G06F 16/34* (2019.01)
*H04L 67/02* (2022.01)

(52) U.S. Cl.
CPC .......... *H04L 63/0815* (2013.01); *G06F 16/34* (2019.01); *G06F 16/957* (2019.01); *H04L 67/02* (2013.01)

(58) Field of Classification Search
CPC ... G06F 16/34; G06F 16/957; H04L 63/0815; H04L 67/02
See application file for complete search history.

(56) References Cited

U.S. PATENT DOCUMENTS

| 9,444,620 | B1 | 9/2016 | Murphy et al. |
| 9,628,471 | B1 | 4/2017 | Sundaram et al. |
| 10,324,606 | B1 * | 6/2019 | Nair ........................ H04L 41/22 |
| 10,726,491 | B1 | 7/2020 | Hockey et al. |
| 2006/0168264 | A1 | 7/2006 | Baba |

(Continued)

FOREIGN PATENT DOCUMENTS

WO 2018-053122 A1 3/2018

OTHER PUBLICATIONS

Hardt, E., The OAuth 2.0 Authorization Framework, Oct. 2012, Updated 8252, downloaded OAuth 2.0 Spec: https://tools.ietf.org/html/rfc6749, 77 pages.

(Continued)

*Primary Examiner* — Gil H. Lee
(74) *Attorney, Agent, or Firm* — McDermott Will & Emery LLP

(57) ABSTRACT

Methods, systems, and storage media for multi-cloud data connections for white-labeled platforms are disclosed. Exemplary implementations may: receive an indication of a plurality of applications to be accessed; receive authentication information for the plurality of applications; establish a plurality of data connections to the plurality of applications, if authenticated with the authentication information; receive application data received from the plurality of data connections; normalize the application data to provide normalized data; generate a customizable feed with display parameters and displaying the normalized data according to the display parameters; and generate a visualization dashboard with visualization parameters and displaying the normalized data according to the visualization parameters.

20 Claims, 7 Drawing Sheets

(56) References Cited

U.S. PATENT DOCUMENTS

| | | | |
|---|---|---|---|
| 2011/0239283 A1* | 9/2011 | Chern | H04L 63/0815 |
| | | | 726/6 |
| 2011/0314482 A1* | 12/2011 | Cupala | G06Q 30/02 |
| | | | 719/328 |
| 2012/0278725 A1* | 11/2012 | Gordon | H04N 21/25891 |
| | | | 715/738 |
| 2014/0006977 A1 | 1/2014 | Adams | |
| 2014/0164504 A1* | 6/2014 | Dellenbach | H04L 67/55 |
| | | | 709/204 |
| 2015/0156065 A1 | 6/2015 | Grandhe et al. | |
| 2016/0004820 A1* | 1/2016 | Moore | H04L 63/1441 |
| | | | 705/3 |
| 2016/0028737 A1 | 1/2016 | Srinivasan | |
| 2016/0350822 A1* | 12/2016 | Ganesan | G06Q 30/0605 |
| 2017/0126649 A1* | 5/2017 | Votaw | G06F 16/24578 |
| 2018/0075231 A1 | 3/2018 | Subrmanian | |
| 2018/0217900 A1 | 8/2018 | Prahlad et al. | |
| 2019/0286832 A1 | 9/2019 | Szeto | |
| 2019/0349447 A1* | 11/2019 | Adams | H04L 67/32 |
| 2019/0354354 A1 | 11/2019 | Dubinskii | |

OTHER PUBLICATIONS

Using OAuth 2.0, Slack: https://api.slack.com/docs/oauth, 8 pages.
Microsoft Teams: Office Products—retrieved on Apr. 3, 2020 from https://docs.microsoft.com/enus/microsoftteams/platform/concepts/authentication/authentication; 6 pages.
US/ISA—International Search Report and Written Opinion for related International Application No. PCT/US2021/052455 dated Jan. 20, 2022, 12 pgs.
USPTO—Non-Final Office Action for related U.S. Appl. No. 16/718,064, dated Feb. 9, 2023, 9 pages.

* cited by examiner

MULTI-CLOUD DATA CONNECTIONS FOR WHITE-LABELED PLATFORMS

TECHNICAL FIELD

The present disclosure generally relates to cloud data technologies, and more particularly to multi-cloud data connections for white-labeled platforms.

BACKGROUND

With the proliferation of productivity applications and associated application data, it is not uncommon for individuals to frequently receive alerts and updates from a multitude of sources throughout the day. While the functionality of each individual productivity application may provide specific benefits, it can be difficult to keep track of and prioritize notifications from the various sources. For example, an individual may be notified of new events, new updates to work projects, new hires or additions to a team, sales data or milestones, and/or the like. Currently, in order to take advantage of the various applications and associated data, individuals must separately keep track of and prioritize alerts and information, often received at the same time or close in temporal proximity. Certain operating systems provide aggregated alerts in the form of a notification bar, but these alerts provide minimal information and do not allow individuals to access the information most useful to them across all applications and data sources.

BRIEF SUMMARY

The subject disclosure addresses shortcomings in existing technologies by providing multi-cloud data connections for white-labeled platforms. Individuals spend a significant amount of time sorting through data and alerts from applications and data sources in order to find the data most applicable to their needs. While many productivity applications provide substantial benefits, these benefits are minimalized because the users can't easily monitor important data across available applications and data sources due to the time required to access each application and data source individually. As such, the benefits of the collective group of applications and data available to users are not fully and efficiently utilized. Implementations described herein address these and other problems by providing a unified location for updates across all applications and a dashboard for visibility of data across these applications. Implementations may create data pipelines to various applications and normalize data from the various applications so that it may be presented in a customizable feed and visualized via a unique dashboard. Implementations provide a user-centric and easy-to-access platform for a user to quickly access data from the applications the user has procured.

One aspect of the present disclosure relates to a method for multi-cloud data connections for white-labeled platforms. The method may include receiving an indication of a plurality of applications to be accessed. The method may include receiving authentication information for the plurality of applications. The method may include establishing a plurality of data connections to the plurality of applications, if authenticated with the authentication information. The method may include receiving application data received from the plurality of data connections. The method may include normalizing the application data to provide normalized data. The method may include generating a customizable feed with display parameters and displaying the normalized data according to the display parameters. The method may include generating a visualization dashboard with visualization parameters and displaying the normalized data according to the visualization parameters.

Another aspect of the present disclosure relates to a system configured for multi-cloud data connections for white-labeled platforms. The system may include one or more hardware processors configured by machine-readable instructions. The processor(s) may be configured to receive an indication of a plurality of applications to be accessed. The processor(s) may be configured to receive authentication information for the plurality of applications. The processor(s) may be configured to establish a plurality of data connections to the plurality of applications, if authenticated with the authentication information. The processor(s) may be configured to receive application data received from the plurality of data connections. The processor(s) may be configured to normalize the application data to provide normalized data. The processor(s) may be configured to generate a customizable feed with display parameters and displaying the normalized data according to the display parameters. The processor(s) may be configured to generate a visualization dashboard with visualization parameters and displaying the normalized data according to the visualization parameters.

Yet another aspect of the present disclosure relates to a non-transient computer-readable storage medium having instructions embodied thereon, the instructions being executable by one or more processors to perform a method for multi-cloud data connections for white-labeled platforms. The method may include receiving an indication of a plurality of applications to be accessed. The method may include receiving authentication information for the plurality of applications. The method may include establishing a plurality of data connections to the plurality of applications, if authenticated with the authentication information. The method may include receiving application data received from the plurality of data connections. The method may include normalizing the application data to provide normalized data. The method may include generating a customizable feed with display parameters and displaying the normalized data according to the display parameters. The method may include generating a visualization dashboard with visualization parameters and displaying the normalized data according to the visualization parameters.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
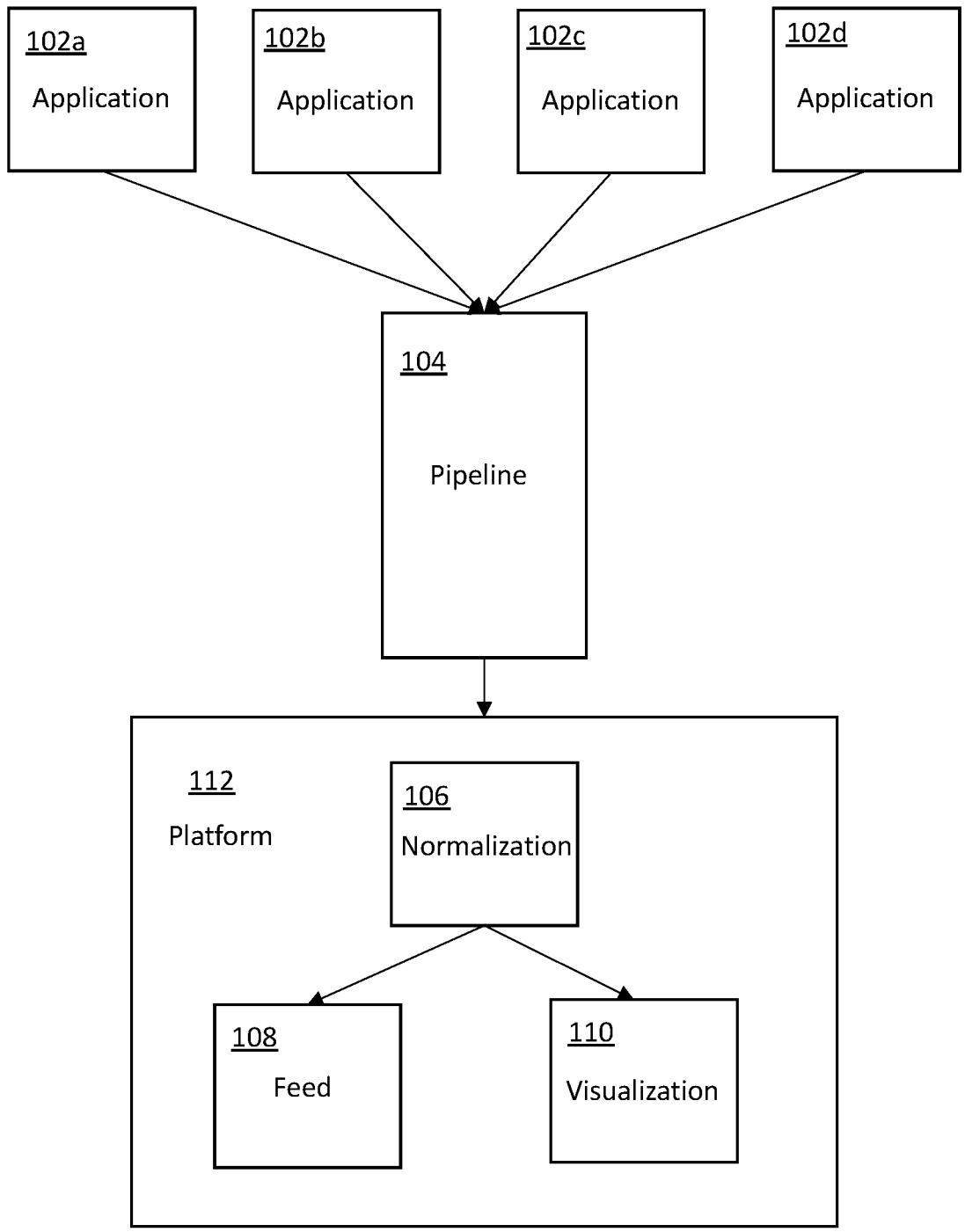
FIG. 1 illustrates a system configured for providing a unified location for updates across applications and visualization of application data, in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Implementations described herein provide platform having a central feed of data across multiple different applications and a dashboard for visibility of data from these applications, or the like. Implementations may create a single data pipeline for accessing data from the various applications and may normalize the data received from the applications so that it may be presented in a customizable feed and visualized via a unique dashboard. Implementations provide a user-centric and easy-to-access platform for a user to quickly access data from the various applications.

Heterogeneous data may be collected from various cloud services, applications, or the like, as input data. This heterogeneous data may be normalized for event processing and visualization. According to aspects of the following detailed description, a single data pipeline may be created for receiving data from various applications the user has selected. A single data application programming interface (API) may be created for the various data sources. All applications may tie into the same API. Data flowing through the API that is normalized may be used to populate the feeds and insights in accordance with implementations of the present disclosure. The various applications may provide unstructured data that must be normalized and transformed into a structured format so that the data may be presented in a feed and displayed in an easy to visualize format for the user. The user may add a multitude of applications to tie into a data feed and/or visualization dashboard and the heterogenous data received from these applications may be normalized into a homogeneous form for use with the platform.

To access the data from the various applications, the user may provide authentication information for each of the applications. In some instances, security tokens may be utilized for authenticating access between the platform and the applications, or the like. Security tokens may authenticate access and allow the platform to access data from the various applications selected by the user. A security token may generally authenticate a user's identity electronically. A Security Token Services (STS), or the like, may issue security tokens that authenticate a user's identity. The security token may be used in addition to or in place of a password to gain access to the various applications. After entering the authentication information for all applications selected by the user or completing authentication using a security token, the user may be provided a single sign-on to access the data across all applications. This single sign-on may remove the need for the user to enter authentication information across all applications.

The data feed may be the primary location where specified application data is displayed. The visualization dashboard may provide insights for the user via visualizations of data received via the single pipeline from whatever applications the user has selected for display. The dashboard may provide the user with visibility of global statistics (e.g., how many emails the user has sent over time, application utilization data, or the like) by presenting the data in graph form. The feed and the dashboard provide a user-centric and easy-to-access platform for users to quickly access pertinent data and allow the users to visually see how application data is being used from the applications the user has purchased. In accordance with some embodiments, a feed may be saved and sent to another user of the system.

The disclosed system(s) address a problem in traditional cloud data techniques tied to computer technology, namely, the technical problem of a collective group of applications and data available to users not being fully and efficiently utilized. The disclosed system solves this technical problem by providing a solution also rooted in computer technology, namely, by providing for multi-cloud data connections for white-labeled platforms. The disclosed subject technology further provides improvements to the functioning of the computer itself because it improves processing and efficiency in cloud data technologies.

FIG. 1 illustrates a system 100 configured for providing a unified location for updates across applications and visualization of application data, in accordance with one or more implementations. In accordance with exemplary embodiments, a system 100 may comprise a platform 112 for providing a feed of data from one or more applications 102a-d via a pipeline 104 after it has been normalized and/or a visualization dashboard for displaying visualizations of data after it has been normalized. A user may purchase or obtain access to various applications 102a-d. The applications 102a-d may comprise various types of productivity applications, such as email, data storage, project management, time management, human resources, accounting apps, and/or the like. The applications 102a-d may generate different types of unstructured or heterogeneous data accessible to the platform 112 via a single pipeline 104. In some embodiments, the pipeline 104 may comprise a single application programming interface (API), wherein all applications 102a-d communicate through the same API and data flowing through the API populates one or more feeds and a visualization dashboard after normalization.

In exemplary embodiments, the platform 112 may comprise a normalization module 106, a feed module 108, and a visualization module 110. The normalization module 106 may receive heterogenous data from the applications 102a-d and transform into structured or homogeneous data for display by the feed module 108 and/or the visualization module 110, or the like. The feed module 108 may accept specifications from a user and generate custom feeds of the data received from the applications 102a-d and normalized by the normalization module 106. The visualization module 110 may generate visualizations of data received from the applications 102a-d according to customization settings received by the platform 112. The visualization module 110, for example, may generate various graphs and/or other visualizations to present the data received from the applications 102a-d.

Figure 2:
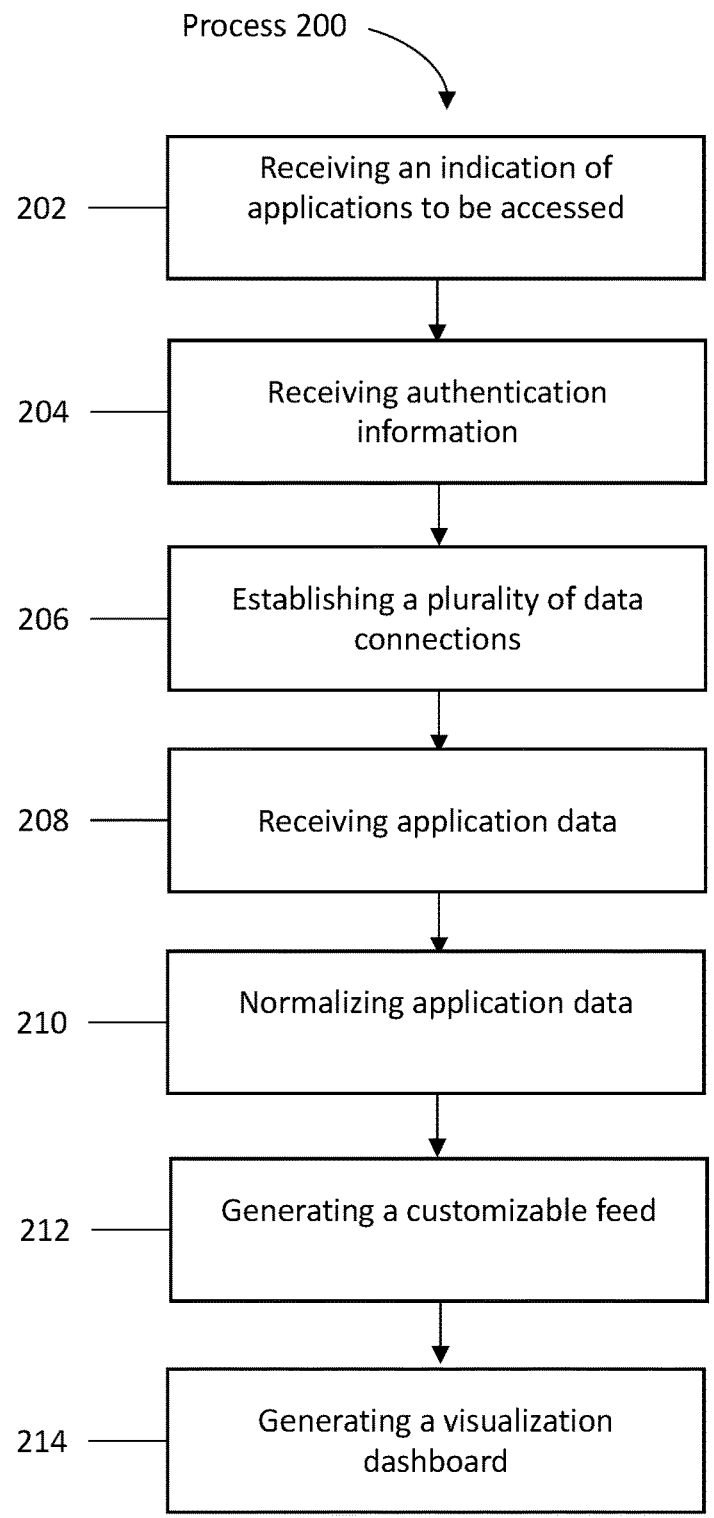
FIG. 2 illustrates an example process flow for normalizing data for use with a customizable feed and a visualization dashboard, in accordance with one or more implementations.

FIG. 2 illustrates an example process flow 200 for normalizing data for use with a customizable feed and a visualization dashboard, in accordance with one or more implementations. The process begins at step 202, where an indication of a plurality of applications to be accessed is received by the platform. In exemplary embodiments, the user may select an application from a list of applications compatible with the platform or may manually enter information regarding the application. When the user selects an application, they may also select whether the data from that application will be made available by the platform to data feeds, a visualization dashboard, or both.

At step 204, authentication information for the plurality of applications may be received by the platform. The authentication information may comprise login information to allow the platform to access data generated by the plurality of applications via a single pipeline. After the authentication information is collected, the platform may allow the user to access all of the applications via the platform using a single one-tough login, or the like.

At step 206, the platform may establish a plurality of data connections to the plurality of applications via a single pipeline, if authenticated with the authentication information received form the user. In some embodiments, a security token may be utilized to allow the user to access data from the plurality of applications. In some embodiments, a security token may be used instead of, or in addition to, username and password information, or the like.

At step 208, application data is received from the plurality of data connections. In exemplary embodiments, application data may include data the user indicates they would like to see in a feed or via a visualization dashboard. In some embodiments, the application data is received via a single application programming interface (API). The data from the API may comprise unstructured or heterogeneous data.

At step 210, the platform may normalize the application data. The application data may be received in unstructured or heterogeneous formats from all of the different applications. In order to be used and displayed by feeds and/or the visualization dashboard, the platform normalizes the data. In accordance with exemplary embodiments, the platform may transform the unstructured or heterogenous data into a structured homogeneous form, allowing it to be used by the platform in feeds or in visualization dashboards.

At step 212, the platform may generate a customizable feed with display parameters and displaying the normalized data according to the display parameters. The platform may accept display parameters from the user and allow the user to create a customized feed of pertinent information and data received across various applications. The feed may include a listing of events or data that is indicated to be relevant to the user according to the user's preferences. The user may select the applications to be included in the feed, the types of data, and may restrict the display data relevant to a timeframe, or the like. The data received from the various applications may be normalized by the platform and then displayed in the feed in accordance with parameters selected by the user.

At step 214, the platform may generate a visualization dashboard with visualization parameters and displaying the normalized data according to the visualization parameters. In accordance with exemplary embodiments, the visualization dashboard may include a display of one or more visual representations of data received from the various applications. The data may be displayed in a format that is configured by the user according to their preferences. For example, a user may prefer to see raw data, text, a pie chart, a bar graph, a table, a line graph, and/or a suitable visual representation of data. The data received from the various applications may be normalized by the platform and then displayed via the visualization dashboard in accordance with parameters selected by the user.

Figure 3:
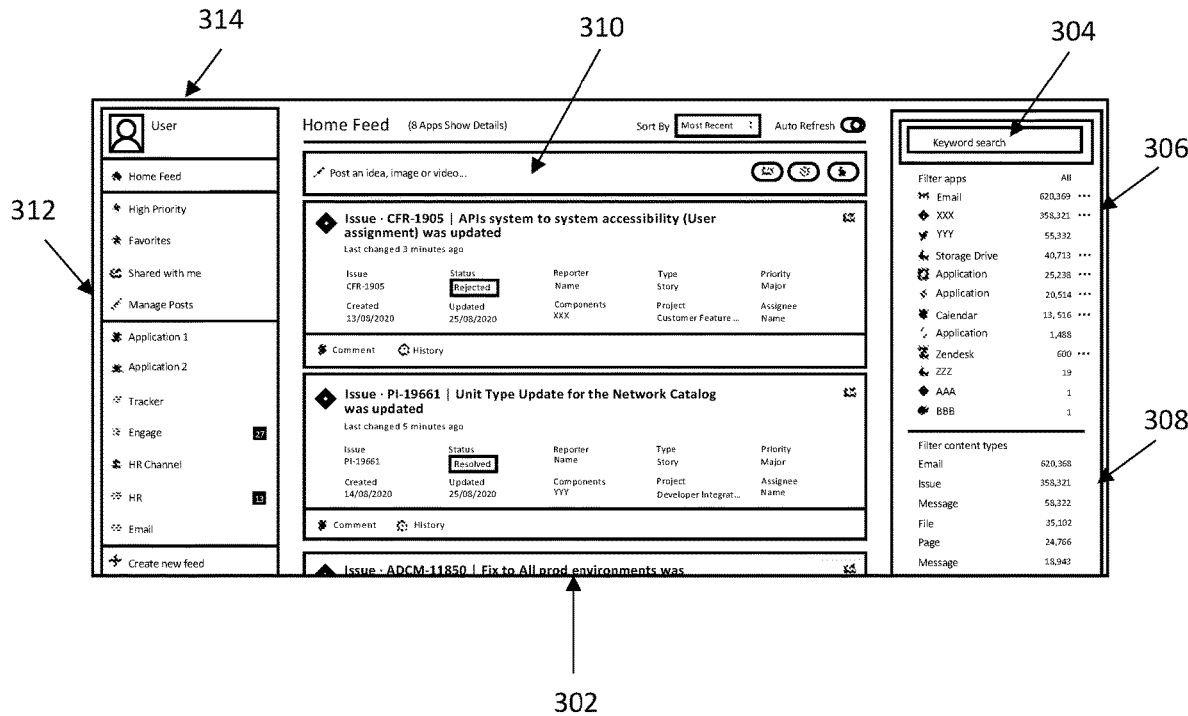
FIG. 3 illustrates an example graphical user interface for a customizable feed, in accordance with one or more implementations.

FIG. 3 illustrates an example graphical user interface 300 for a customizable feed, in accordance with one or more implementations. In accordance with exemplary embodiments of the present disclosure, the user interface 300 may comprise a feed 302 of data received from various applications. The feed 302 may be displayed in accordance with user preferences and may list information designated as important by the user. The user interface 300 may comprise a display indicating the user information 314 of the user that is currently logged into the system. The user information 314 may comprise data regarding the user, including name, photograph, title, company, contact information, and/or the like. In accordance with exemplary embodiments of the present disclosure, the user interface 300 may comprise various options for displaying different feeds configured by the user, or the like. For example, the user may configure certain feeds to display high priority information, information from favorite sources, information shared with the user from another user, and/or the like. This information may be displayed by selecting an option in a configuration panel 312 of the user interface 300.

In some implementations, the user interface 300 may comprise an option for a user to post directly to the feed 302 with a post input area 310, or the like. A post entered through the input area 310 may include an idea, an image, a video, an appointment, other data, and/or the like. When a first user posts to a feed 302 with the input area 310, the post may be visible by a second user if the first user indicates the second user is an intended recipient of the post or if the second user subscribes to, and has access to view, the feed 302 the user posts to. In some implementations, a user may save a feed 302 and the associated configuration parameters and transmit that feed to a second user, group of users, or the like.

In exemplary embodiments of the present disclosure, the user interface 300 may include a data source listing 306 that allows a user to filter the feed 302 by data received from specific data sources selected by the user. By way of example, data sources may include email applications, social networking applications, calendar applications, data storage applications, productivity applications, and/or the like. The interface 300 may comprise a search input 304 for searching for and filtering apps by keyword, phrase, or the like for easy access by the user. In some embodiments, the user interface 300 may include a content filter 308. In some implementations, a contact filter 308 may allow the user to display data by content type. Content types may include, for example, email, issue, messages, files, pages, sales data, and/or the like. The feed 302 may display the content type selected by the user with the content filter 308, or the like.

Figure 4:
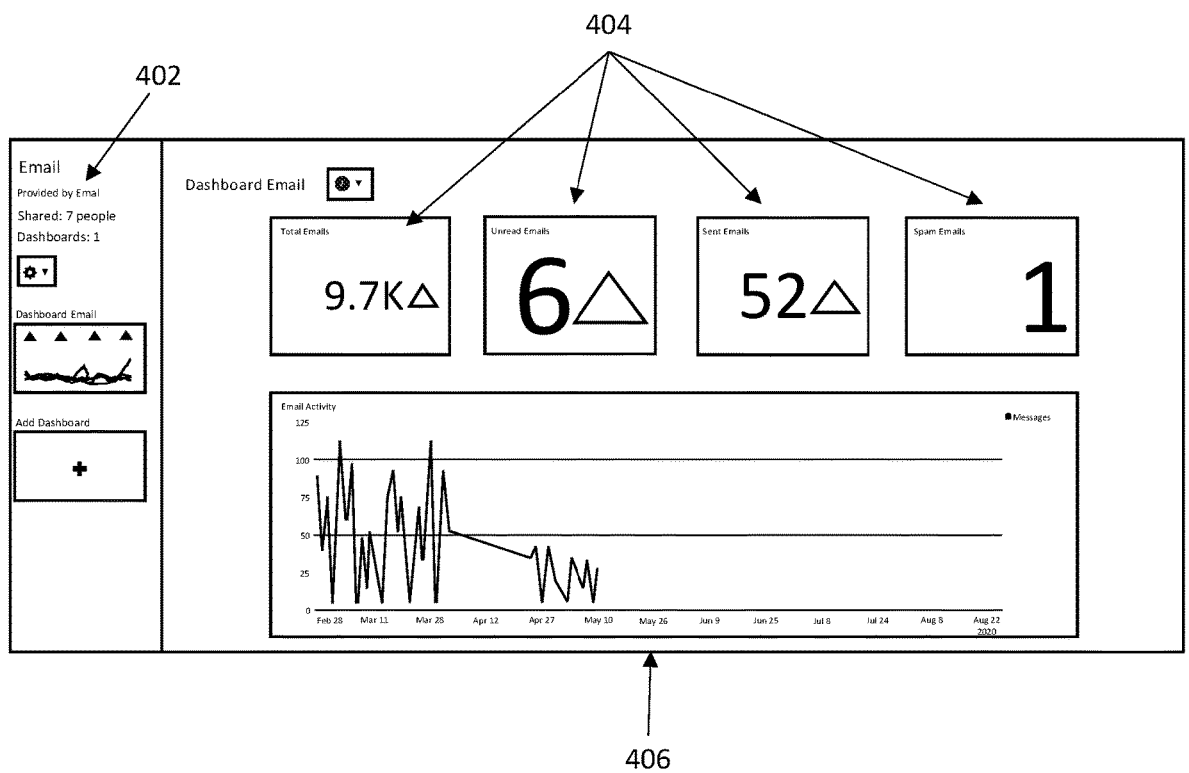
FIG. 4 illustrates an example graphical user interface for a visualization dashboard, in accordance with one or more implementations.

FIG. 4 illustrates an example dashboard 400 for visualization of data, in accordance with one or more implementations. In accordance with exemplary embodiments, the dashboard 400 may present data received from various applications in a visual form configured by the user, or the like. For example, the user may choose to display data in the form of a numerical display 404. The numerical display 404 may display a dynamic number for the data requested to be displayed by the user. In some implementations, the user may decide to have data stored in a graph display 406. The graph display 406 may display data from the various applications in a graphical format. For example, the graph display 406 may display the data in a pie chart, a bar graph, a line graph, a suitable graphical representation of data received from the applications, and/or the like. In some implementations, a data source indication 402 may provide an indication of the application relevant to the data displayed via the dashboard 400. In some embodiments, the data displayed on the dashboard 400 may come from a single application or may include data received from multiple applications. The dashboard 400 may include data that is a snapshot of data received at a specific point in time or time range or it may display data received dynamically from one or more applications, or the like. In some embodiments, the platform may normalize data received from the various applications so that it may be displayed via the dashboard 400 in a form selected or configured by the user.

Figure 5:
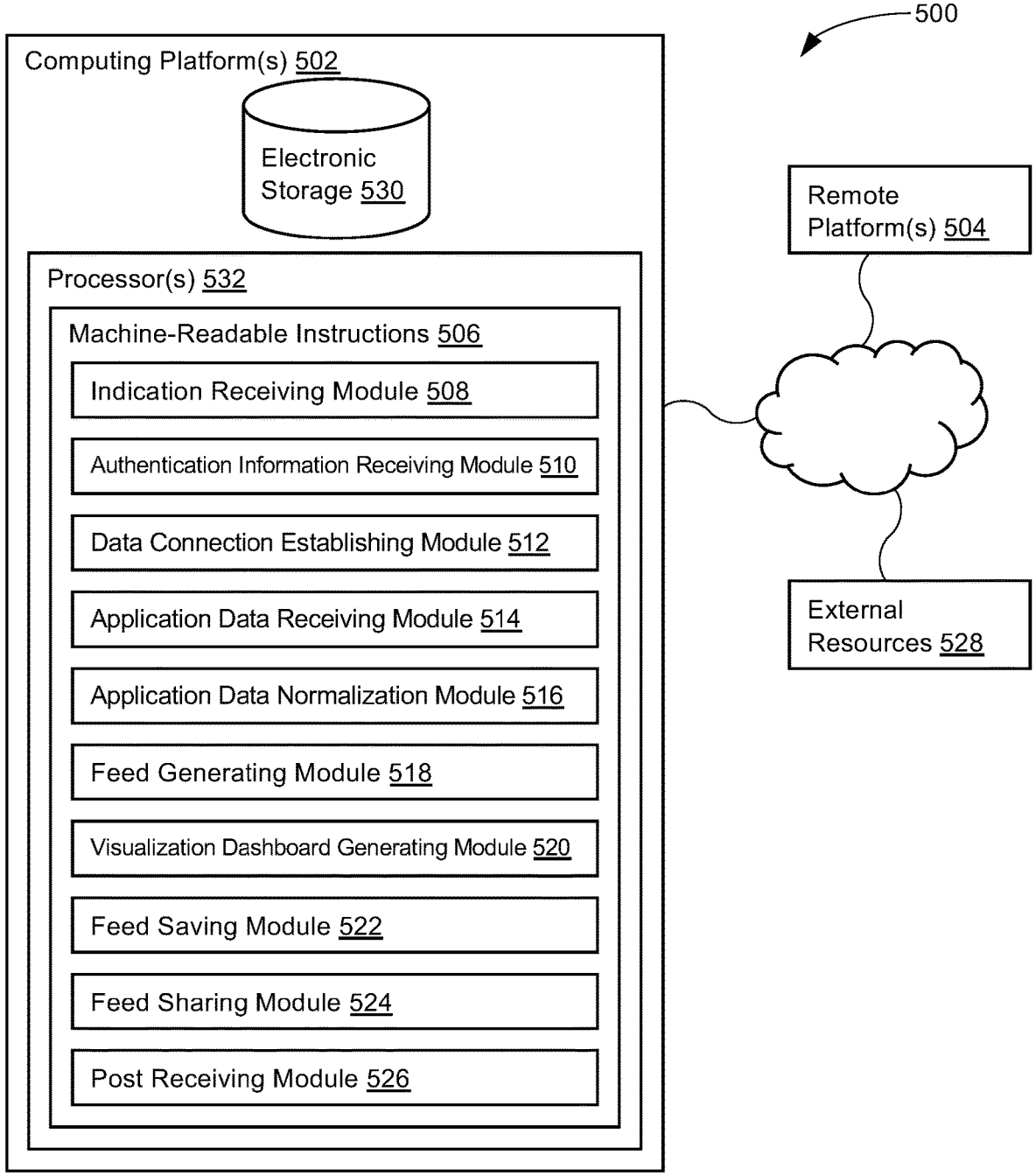
FIG. 5 illustrates a system configured for multi-cloud data connections for white-labeled platforms, in accordance with one or more implementations.

FIG. 5 illustrates a system 500 configured for multi-cloud data connections for white-labeled platforms, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of indication receiving module 508, authentication information receiving module 510, data connection establishing module 512, application data receiving module 514, application data normalization module 516, feed generating module 518, visualization dashboard generating module 520, feed saving module 522, feed sharing module 524, post receiving module 526, and/or other instruction modules.

Indication receiving module 508 may be configured to receive an indication of a plurality of applications to be accessed. The indication of the plurality of applications to be accessed may be received by a user via a new connections interface. The new connections interface may be configured to display a list of the plurality of applications for selection by the user. The new connections interface may include a list of applications or data sources selectable by the user for display via a feed or visualization dashboard in accordance with embodiments of the present disclosure. The new connections interface may include a list of preselected applications or may allow for a user to input information for an application or data source that is not listed by the platform, or the like.

Authentication information receiving module 510 may be configured to receive authentication information for the plurality of applications. Authentication information may include username/pas sword information, biometric identification information, a security token, and/or the like. The authentication information may allow the platform to access various applications or data sources and receive data via a single pipeline for display via a feed, a visualization dashboard, or the like.

Data connection establishing module 512 may be configured to establish a plurality of data connections to the plurality of applications, if authenticated with the authentication information. Data connections may enable a flow of data to and from an application to a platform in accordance with exemplary embodiments of the present disclosure. Individual connections of the plurality of data connections may be established via a single application data interface connected to the plurality of applications and data received by the single application data interface includes unstructured data. Application data may include data generated by or received from applications connected to the platform for display via the application data interface or pipeline. The plurality of data connections may be accessed via a unified authentication and a single sign-on configured for allowing access to individual ones of the plurality of applications via the single sign-on. A unified authentication may comprise a single user sign-on/login to allow the user to log in a single time to access data across all applications/data sources the user has purchased, or the like.

Application data receiving module 514 may be configured to receive application data received from the plurality of data connections. The application data may be received from a selected set of applications from the plurality of applications. In some implementations, the set selected via a data source management interface. A single sign-on may be accomplished via a security token, or the like. A data source management interface may allow the user to select applications or data sources for use with the platform. The applications and/or data sources selected by the user may be connected with the platform via a single data pipeline after authentication information for accessing the applications and/or data sources has been received, or the like.

Application data normalization module 516 may be configured to normalize the application data to provide normalized data.

Feed generating module 518 may be configured to generate a customizable feed with display parameters and displaying the normalized data according to the display parameters. Display parameters may include the types of data, data created, modified, or relevant to a certain date or date range, data from a certain application, data containing a certain keyword, data containing certain statistical indicators chosen by the user, or any data from applications and/or data sources that may be helpful to the user. The customizable feed may be a primary display for normalized data across the plurality of applications received via a single application programming interface. The single application programming interface may serve as a single connection or pipeline for all the data generated and/or received from the connected applications and/or data sources. The primary display may include a listing of the various applications and/or data sources the user has connected with and a listing of data the user has indicated they would like to be displayed in a feed. The customizable feed displays normalized data received from more than one of the plurality of applications. Normalized data may comprise data that has been transformed from an unstructured format to a single usable format or the user. A display device may display the customizable feed displays in accordance with parameters selected by the user. The customizable feed may include a unified location for displaying updates from the plurality of applications. The customizable feed may include visual customizations such as the size and format of the data presented and it may include data content customizations such as the types, relevancy, or age of data generated by the data sources and/or applications. Updates may include any updated data, which may be dynamic data, received from the applications and/or data sources connected to the platform, or the like. In some implementations, by way of non-limiting example, the updates may include at least one of creation, deletion, rejection, acceptance, or modification of specific events or objects. Deletion of data may include removal of the data from the platform, or the like. Rejection, acceptance, or modification of a specific event or object may include rejection, acceptance, or modification of a proposal, such as a proposed change to a project or a specific event. A specific event may be a meeting request, a project timeline, and/or the like. The display parameters may include relevancy and recency requirements. Recency requirements may limit the display to data generated or relevant-to a specific timeframe. By way of non-limiting example, the display parameters for the customizable feed may include at least one of data received from one or more users, data received from individual applications, data containing keywords, and data including specific content types. Specific content types may include types of data, including statistical data, meeting data, project management data, and/or the like. The customizable feed may include options for the user for different views including high priority data or favorite data. High priority data may include data the user or the platform has indicated is of a higher priority than other data. Favorite data may include a set of data selected by the user for repeat and easy access.

Visualization dashboard generating module 520 may be configured to generate a visualization dashboard with visualization parameters and displaying the normalized data according to the visualization parameters. Visualization may include a display of data to the user, or the presentation of data visually. Visualization parameters may be the format the user selects to display the data. The visualization dashboard may include a display for visualization of statistics from the plurality of applications. Statistics may include snapshots or trends of specific data generated by the applications. The application data may be normalized with a transformation service to transform the application data into structured data to be utilized by the customizable feed and the visualization dashboard. A transformation service may receive unstructured data or heterogenous data from applications and transforms the data into structured or homogeneous data in a useable format for the feeds or visualization dashboards described herein.

The visualization dashboard with visualization parameters may provide a visible representation of the normalized data according to the visualization parameters. A visible representation may include a number or a graphical representation of data displayed via a display in accordance with embodiments of the present disclosure. The widget can be defined by a user or an administrator. An administrator may be an individual or a system role that is granted administrative privileges to modify settings described herein. By way of non-limiting example, the visualization parameters may include at least one of a graph, a table, or a single number. A single number may be a display of a number that indicates a measure of data received from the applications. The visualization parameters may include at least one of a size and location of a visual representation of the normalized data. A visual representation may include a graphical representation of the data or other suitable presentation selected by the user. The visualization dashboard may include a widget for display in a plurality of applications. A widget may include an application, or a component of an interface, that enables a user to perform a function or access a service. A widget may be portable to various applications. The customizable feed and the visualization dashboard may be customizable according to a role of a user within the system. The user may do not need access to the plurality of applications to view the customizable feed.

A user can select whether individual applications from a plurality of applications may provide to the customizable feed or the visualization dashboard. At least one of the customizable feed and the visualization dashboard may be dynamically updated with data received by a single application programming interface.

Feed saving module 522 may be configured to save the customizable feed.

Feed sharing module 524 may be configured to share the customizable feed with an additional user.

Post receiving module 526 may be configured to receive a post from a user and displaying the post in the customizable feed for all users of the system.

In some implementations, computing platform(s) 502, remote platform(s) 504, and/or external resources 528 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 528 may be operatively linked via some other communication media.

A given remote platform 504 may include one or more processors configured to execute computer program modules. The computer program modules may be configured to enable an expert or user associated with the given remote platform 504 to interface with system 500 and/or external resources 528, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 528 may include sources of information outside of system 500, external entities participating with system 500, and/or other resources. In some implementations, some or all of the functionality attributed herein to external resources 528 may be provided by resources included in system 500.

Computing platform(s) 502 may include electronic storage 530, one or more processors 532, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 530 may comprise non-transitory storage media that electronically stores information. The electronic storage media of electronic storage 530 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 530 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 530 may include one or more virtual storage resources (e.g., cloud storage, a virtual private network, and/or other virtual storage resources). Electronic storage 530 may store software algorithms, information determined by processor(s) 532, information received from computing platform(s) 502, information received from remote platform(s) 504, and/or other information that enables computing platform(s) 502 to function as described herein.

Processor(s) 532 may be configured to provide information processing capabilities in computing platform(s) 502. As such, processor(s) 532 may include one or more of a digital processor, an analog processor, a digital circuit designed to process information, an analog circuit designed to process information, a state machine, and/or other mechanisms for electronically processing information. Although processor(s) 532 is shown in FIG. 5 as a single entity, this is for illustrative purposes only. In some implementations, processor(s) 532 may include a plurality of processing units. These processing units may be physically located within the same device, or processor(s) 532 may represent processing functionality of a plurality of devices operating in coordination. Processor(s) 532 may be configured to execute modules 508, 510, 512, 514, 516, 518, 520, 522, 524, and/or 526, and/or other modules. Processor(s) 532 may be configured to execute modules 508, 510, 512, 514, 516, 518, 520, 522, 524, and/or 526, and/or other modules by software; hardware; firmware; some combination of software, hardware, and/or firmware; and/or other mechanisms for configuring processing capabilities on processor(s) 532. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, and/or 526 are illustrated in FIG. 5 as being implemented within a single processing unit, in implementations in which processor(s) 532 includes multiple processing units, one or more of modules 508, 510, 512, 514, 516, 518, 520, 522, 524, and/or 526 may be implemented remotely from the other modules. The description of the functionality provided by the different modules 508, 510, 512, 514, 516, 518, 520, 522, 524, and/or 526 described below is for illustrative purposes, and is not intended to be limiting, as any of modules 508, 510, 512, 514, 516, 518, 520, 522, 524, and/or 526 may provide more or less functionality than is described. For example, one or more of modules 508, 510, 512, 514, 516, 518, 520, 522, 524, and/or 526 may be eliminated, and some or all of its functionality may be provided by other ones of modules 508, 510, 512, 514, 516, 518, 520, 522, 524, and/or 526. As another example, processor(s) 532 may be configured to execute one or more additional modules that may perform some or all of the functionality attributed below to one of modules 508, 510, 512, 514, 516, 518, 520, 522, 524, and/or 526.

Figure 6:
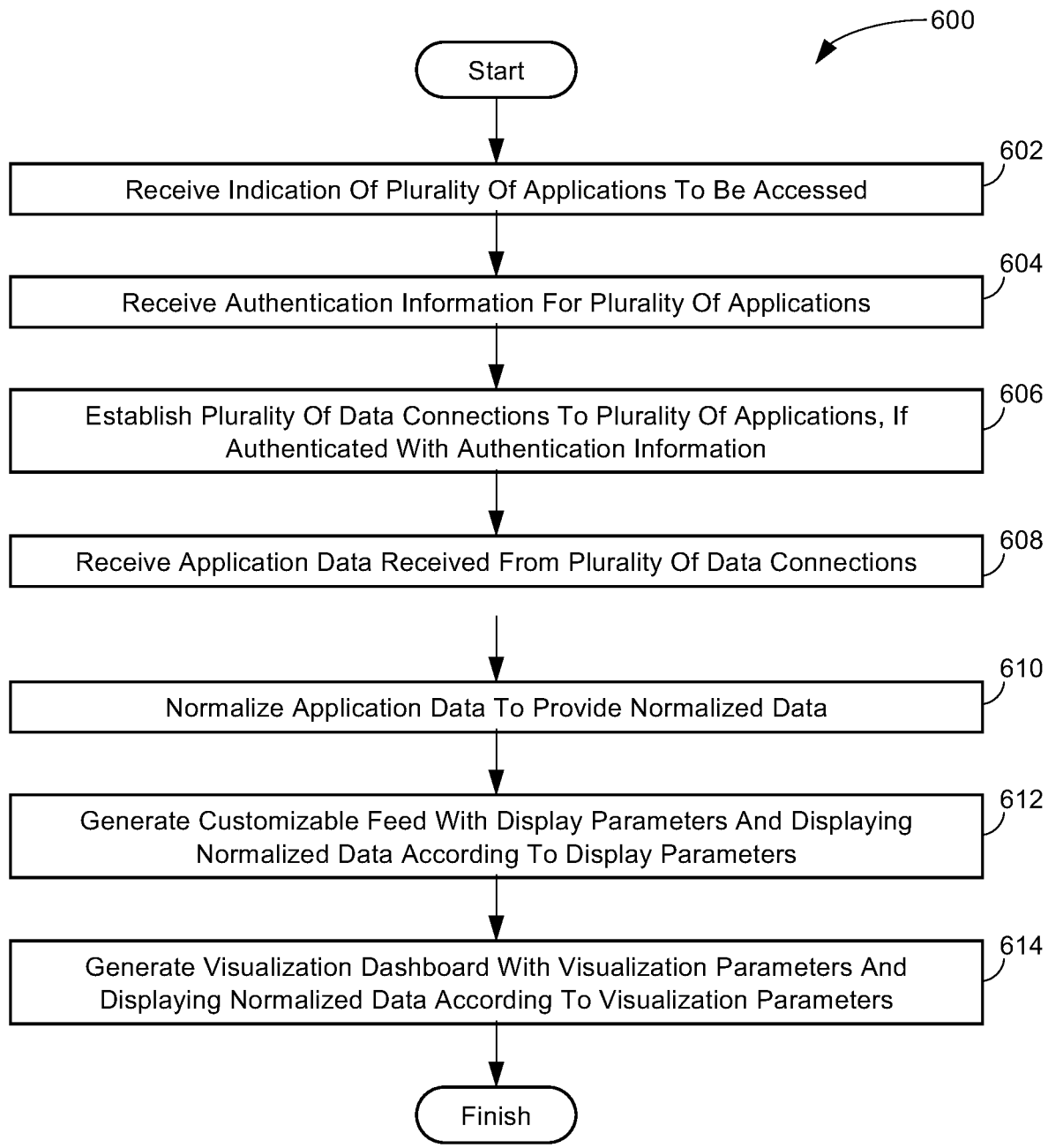
FIG. 6 illustrates an example flow chart for multi-cloud data connections for white-labeled platforms, in accordance with one or more implementations.

FIG. 6 an example flow diagram (e.g., process 600) for multi-cloud data connections for white-labeled platforms, according to certain aspects of the disclosure. For explanatory purposes, the example process 600 is described herein with reference to FIG. 5. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIG. 5.

At step 602, the process 600 may include receiving an indication of a plurality of applications to be accessed. Step 602 may be performed by one or more hardware processors configured by machine-readable instructions including a module that is the same as or similar to indication receiving module 508, according to certain aspects of the disclosure.

At step 604, the process 600 may include receiving authentication information for the plurality of applications. Step 604 may be performed by one or more hardware processors configured by machine-readable instructions including a module that is the same as or similar to authentication information receiving module 510, according to certain aspects of the disclosure.

At step 606, the process 600 may include establishing a plurality of data connections to the plurality of applications, if authenticated with the authentication information. Step 606 may be performed by one or more hardware processors configured by machine-readable instructions including a module that is the same as or similar to data connection establishing module 512, according to certain aspects of the disclosure.

At step 608, the process 600 may include receiving application data received from the plurality of data connections. Step 608 may be performed by one or more hardware processors configured by machine-readable instructions including a module that is the same as or similar to application data receiving module 514, according to certain aspects of the disclosure.

At step 610, the process 600 may include normalizing the application data to provide normalized data. Step 610 may be performed by one or more hardware processors configured by machine-readable instructions including a module that is the same as or similar to application data normalization module 516, according to certain aspects of the disclosure.

At step 612, the process 600 may include generating a customizable feed with display parameters and displaying the normalized data according to the display parameters. Step 612 may be performed by one or more hardware processors configured by machine-readable instructions including a module that is the same as or similar to feed generating module 518, according to certain aspects of the disclosure.

At step 614, the process 600 may include generating a visualization dashboard with visualization parameters and displaying the normalized data according to the visualization parameters. Step 614 may be performed by one or more hardware processors configured by machine-readable instructions including a module that is the same as or similar to visualization dashboard generating module 520, according to certain aspects of the disclosure.

Figure 7:
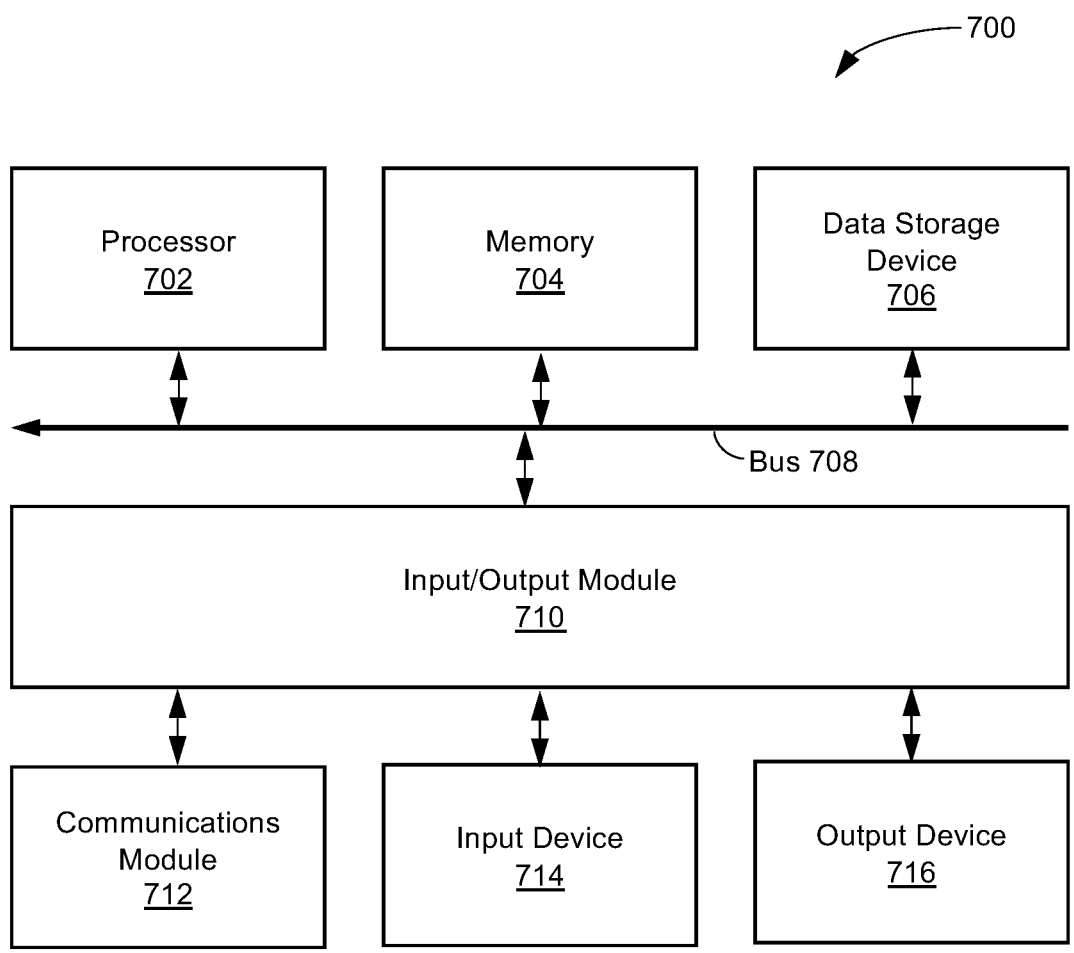
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network or the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method for multi-cloud data connections for white-labeled platforms, the method comprising:
receiving an indication of a plurality of applications to be accessed;
receiving authentication information for the plurality of applications, the authentication information comprising security tokens;
establishing a plurality of data connections to the plurality of applications;
based on establishing the plurality of data connections, generating a single channel, wherein the security token provides access to the plurality of data connections;
receiving application data received from the plurality of data connections via the single channel;

normalizing the application data to provide normalized data;
generating a customizable feed, via the single channel, with display parameters and displaying the normalized data according to the display parameters, the customizable feed comprising visual customizations or data content customizations, wherein the visual customizations comprise size or format of the normalized data, and the data content customizations comprise relevancy or age of the normalized data; and
generating a visualization dashboard with visualization parameters and displaying the normalized data according to the visualization parameters, the visualization dashboard comprising a numerical display comprising a dynamic number relating to the normalized data and a graph display for the normalized data.

2. The method of claim 1, wherein the customizable feed is a primary display for normalized data across the plurality of applications received via a single application programming interface.

3. The method of claim 1, wherein the display parameters comprise relevancy and recency requirements.

4. The method of claim 1, wherein the customizable feed displays normalized data received from more than one of the plurality of applications.

5. The method of claim 1, wherein the customizable feed comprises a unified location for displaying updates from the plurality of applications, the updates comprising at least one of creation, deletion, rejection, acceptance, or modification of specific events or objects.

6. The method of claim 1, wherein the visualization dashboard comprises a display for visualization of statistics from the plurality of applications.

7. The method of claim 1, wherein individual ones of the plurality of data connections is established via a single application data interface connected to individual ones of the plurality of applications and data received by the single application data interface comprises unstructured data.

8. The method of claim 1, wherein the application data is normalized with a transformation service to transform the application data into structured data to be utilized by the customizable feed and the visualization dashboard.

9. The method of claim 1, wherein the plurality of data connections is accessed via a unified authentication and a single sign-on configured for allowing access to individual ones of the plurality of applications via the single sign-on.

10. The method of claim 1, wherein the application data is received from a selected set of applications from the plurality of applications, the set selected via a data source management interface.

11. A system configured for multi-cloud data connections for white-labeled platforms, the system comprising:
one or more hardware processors configured by machine-readable instructions to:
receive an indication of a plurality of applications to be accessed;
receive authentication information for the plurality of applications, the authentication information comprising security tokens;
establish a plurality of data connections to the plurality of applications;
based on establishing the plurality of data connections, generate a single channel, wherein the security token provides access to the plurality of data connections;
receive application data received from the plurality of data connections via the single channel;
normalize the application data to provide normalized data;
generate a customizable feed, via the single channel, with display parameters and displaying the normalized data according to the display parameters; and
generate a visualization dashboard with visualization parameters and displaying the normalized data according to the visualization parameters, the visualization dashboard comprising a numerical display comprising a dynamic number relating to the normalized data and a graph display for the normalized data.

12. The system of claim 11, wherein the customizable feed is a primary display for normalized data across the plurality of applications received via a single application programming interface.

13. The system of claim 11, wherein the display parameters comprise relevancy and recency requirements.

14. The system of claim 11, wherein the customizable feed displays normalized data received from more than one of the plurality of applications.

15. The system of claim 11, wherein the customizable feed comprises a unified location for displaying updates from the plurality of applications, the updates comprising at least one of creation, deletion, rejection, acceptance, or modification of specific events or objects.

16. The system of claim 11, wherein the visualization dashboard comprises a display for visualization of statistics from the plurality of applications.

17. The system of claim 11, wherein individual ones of the plurality of data connections is established via a single application data interface connected to individual ones of the plurality of applications and data received by the single application data interface comprises unstructured data.

18. The system of claim 11, wherein the application data is normalized with a transformation service to transform the application data into structured data to be utilized by the customizable feed and the visualization dashboard.

19. The system of claim 11, wherein the plurality of data connections is accessed via a unified authentication and a single sign-on configured for allowing access to individual ones of the plurality of applications via the single sign-on, wherein the application data is received from a selected set of applications from the plurality of applications, the set selected via a data source management interface.

20. A non-transient computer-readable storage medium having instructions embodied thereon, the instructions being executable by one or more processors to perform a method for multi-cloud data connections for white-labeled platforms, the method comprising:
receiving an indication of a plurality of applications to be accessed;
receiving authentication information for the plurality of applications, the authentication information comprising security tokens;
establishing a plurality of data connections to the plurality of applications, if authenticated with the authentication information;
based on establishing the plurality of data connections, generating a single channel, wherein the security token provides access to the plurality of data connections;
receiving application data received from the plurality of data connections via the single channel;
normalizing the application data to provide normalized data;
generating a customizable feed, via the single channel, with display parameters and displaying the normalized data according to the display parameters; and
generating a visualization dashboard with visualization parameters and displaying the normalized data according to the visualization parameters, the visualization dashboard comprising a numerical display comprising a dynamic number relating to the normalized data and a graph display for the normalized data.

* * * * *